United States Patent
Macpherson

(10) Patent No.: US 6,780,459 B2
(45) Date of Patent: Aug. 24, 2004

(54) METHOD FOR STABILIZING IRREGULAR STRUCTURES

(76) Inventor: Scott Macpherson, 8657 Side Road 20, Eramosa, Rockwood, Ontario (CA), N0B 2K0

(*) Notice: Subject to any disclaimer, the term of this patent is extended or adjusted under 35 U.S.C. 154(b) by 174 days.

(21) Appl. No.: 10/220,504
(22) PCT Filed: Feb. 23, 2001
(86) PCT No.: PCT/CA01/00213
§ 371 (c)(1),
(2), (4) Date: Aug. 30, 2002
(87) PCT Pub. No.: WO01/64603
PCT Pub. Date: Sep. 7, 2001

(65) Prior Publication Data
US 2003/0022960 A1 Jan. 30, 2003

Related U.S. Application Data
(60) Provisional application No. 60/186,678, filed on Mar. 3, 2000.

(51) Int. Cl.[7] ................................................ B05D 1/00
(52) U.S. Cl. .................. 427/207.1; 427/244; 427/393.6
(58) Field of Search ............................ 427/207.1, 244, 427/393.6

(56) References Cited

U.S. PATENT DOCUMENTS

| | | | |
|---|---|---|---|
| 4,738,989 A | | 4/1988 | Smith |
| 4,748,192 A | | 5/1988 | Smith |
| 4,748,201 A | | 5/1988 | Smith |
| 5,221,725 A | * | 6/1993 | Izumo et al. ................. 528/64 |
| 5,364,852 A | * | 11/1994 | Hinz et al. .................. 521/159 |
| 5,759,695 A | | 6/1998 | Primeaux, II |

FOREIGN PATENT DOCUMENTS

| | | |
|---|---|---|
| WO | WO 91 19690 | 12/1991 |
| WO | WO 99 / 01492 | * 1/1999 |

* cited by examiner

*Primary Examiner*—Erma Cameron
(74) *Attorney, Agent, or Firm*—Sim & McBurney

(57) ABSTRACT

The present invention provides a method for stabilizing irregular structures such as rock structures in mines and in construction sites as well as other rock and concrete structures. The method comprises concurrently heating and mixing a mixture of polyoxypropylene diamine with an aromatic diamine liquid, mechanically purging the mixture under pressure and applying the purged mixture to a desired irregular structure. The invention also provides a weather resistant and anti-corrosive polyurea coating material as a fibrous mesh, liquid film, geotextile mat and foam for stabilizing rock, concrete and molding tool structures.

10 Claims, 4 Drawing Sheets

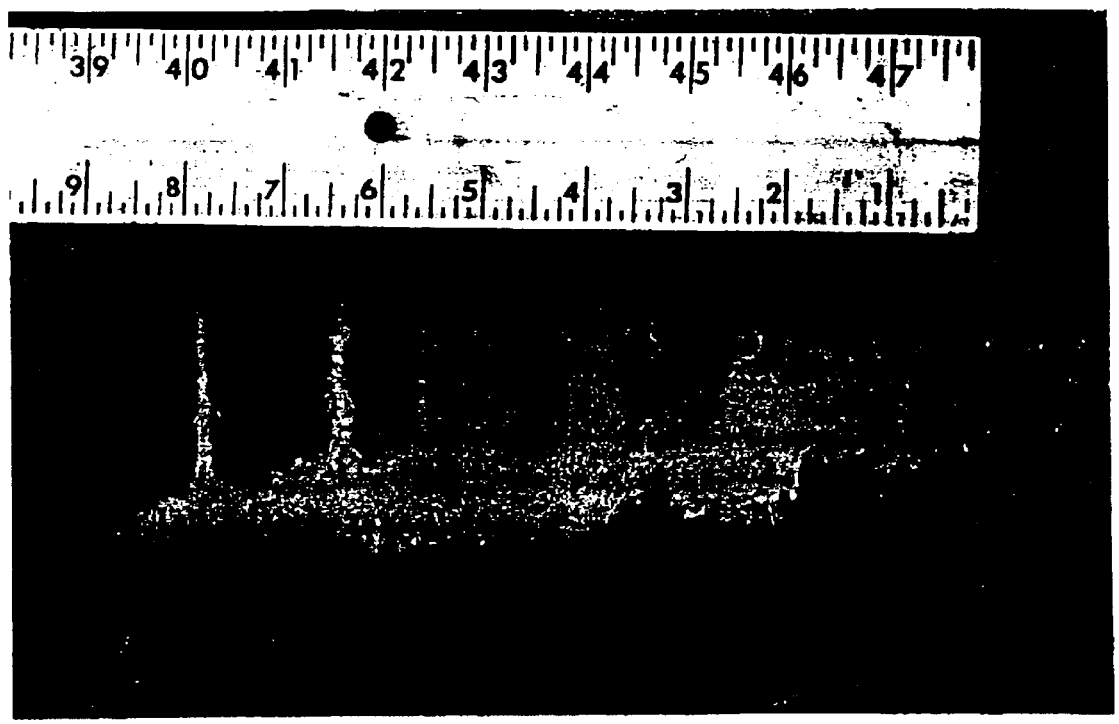
FIG.2
FIG.3A
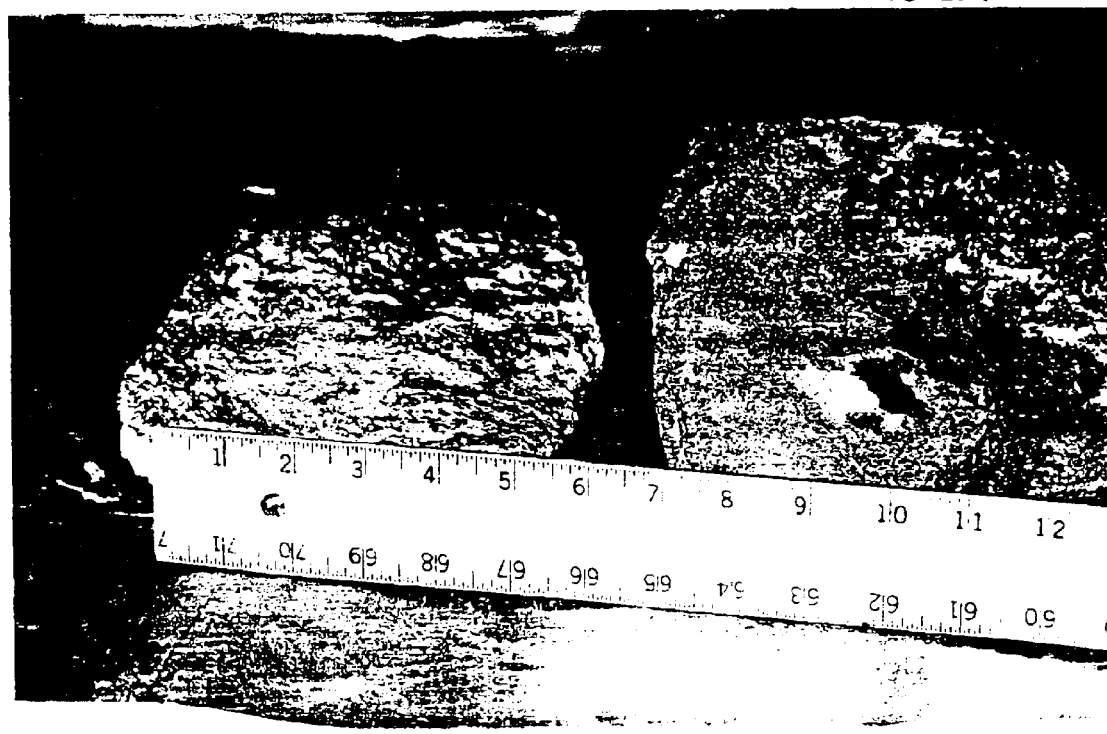

METHOD FOR STABILIZING IRREGULAR STRUCTURES

This application claims the benefit of Provisional Application No. 60/186,678 filed Mar. 3, 2000.

FIELD OF THE INVENTION

This invention relates to a method for stabilizing irregular structures such as rock structures in mines as well as other rock, concrete and molding tool structures. The invention also relates to weather resistant and anti-corrosive polyurea coating materials for stabilizing irregular structures.

BACKGROUND OF THE INVENTION

Membrane coatings have been developed for the purpose of partially replacing the screen component of bolts-and-screen or thin shotcrete layers in mines. Such coatings are used primarily in underground hard rock mines for the provision of rapidly-deployable area support coverage.

One such coating material Mineguard™, described in PCT/CA91/00223, is a polyurethane polymer coating which forms a conventional plastic membrane on selected surfaces. Other types of polyurethane coatings that form thin membranes on certain surfaces are described in U.S. Pat. Nos. 4,748,201, 4,748,192 and 4,738,989.

While some of these aforementioned types of polyurethane coatings have been used for stabilization of rock structures in mining, these coatings are thin and provide only limited support and strength to certain structures. Such coatings don't adequately fill cracks, crevices and fractured ground without repeated time-consuming and expensive applications. Furthermore, these polyurethane coatings are also conventionally applied to form a thin membrane cover and do not have widespread applications in other fields.

There has not been provided an effective rapid method using a particular polyurea or polyurethane type coating material that can effectively produce a cohesive coating material which acts to stabilize rock and concrete structures or other irregular structures as well as provide durability, weatherability and anti-corrosion properties to the structure. Furthermore, there is presently no polyurea or polyurethane type mesh or film coating that provides the necessary characteristics to effectively stabilize various irregular structures and that has general use in the field of mining construction and composite parts manufacturing.

There is therefore a need to develop a simple, rapid and cost efficient method for stabilizing irregular structures such as rock and concrete structures that obviates at least some of the shortcomings of the prior art.

SUMMARY OF THE INVENTION

The present invention relates to a fast reacting method of making a polyurea coating material for stabilizing irregular structures and the polyurea coatings so prepared. The method and the polyurea coating materials have widespread use in the stabilization of irregular structures such as irregular rock, concrete and molding tool structures.

In accordance with an aspect of the present invention is a novel method for stabilizing irregular rock, concrete and molding tool surfaces and structures in general. The method of the present invention is simple to use and effectively provides in one aspect a cohesive unwoven type fabric that can be applied to uneven and irregular surfaces to create a consolidating and stabilizing mesh or webbing type of membrane. As such, the method provides a fibrous weather resistant and anti-corrosion type mesh that has the ability to bridge large gaps and cracks in irregular structures especially rock and concrete structures. The fibrous mesh can withstand large fluctuations in temperature and precipitation with minimal deterioration or effect on its stabilizing properties on the applied underlying structures.

In the first aspect, the method is preferably used to provide a fibrous mesh that acts to effectively, rapidly and safely stabilize rock structures particularly in hard rock mining. The fibrous mesh can effectively fill large gaps in various rock and tunnel structures. The method can also be used to stabilize rocky hillsides adjacent highways to prevent falling rocks and rock slides. The method also has general use in the construction industry in order to stabilize any type of concrete or concrete/rock structure.

The method of the present invention in this aspect, allows for air and water permeation therethrough when the material is applied as a mesh or webbing.

In another aspect of the present invention, the method can be altered to provide a plastic film type of polyurea coating which is impermeable to water and air. In this aspect, the plastic film coating has application in the field of mold tooling especially for making molds and the like. In a further aspect of the invention, the method can provide for a more matted geotextile type mesh product that has use in the landscaping and road building trades.

In yet still a further aspect, the method can provide a "jelly" state that is useful as an adhesive. With respect to any aspects of the invention, the resultant polyurea material provided as a fibrous mesh, matted mesh, plastic film or jelly state can be provided as a layered or multi layered structure incorporating the various formats of polyurea material.

According to an aspect of the present invention is a polyurea spray system for providing a stabilizing polyurea material.

According to a further aspect of the present invention is a polyurea spray system for providing a stabilizing polyurea fibrous mesh material.

According to still a further aspect of the present intention is a polyurea spray system for providing a stabilizing polyurea plastic film material.

According to yet a further aspect of the present invention is a polyurea spray system for providing a stabilizing polyurea geotextile matted material.

According to another aspect of the present invention is a polyurea spray system for providing a stabilizing polyurea foam material.

According to still another aspect of the present invention is a polyurea spray system for providing a stabilizing polyurea jelly material.

According to an aspect of the present invention is a method for stabilizing irregular rock, concrete and molding tool structures, the method comprising
  concurrently heating and mixing a mixture of polyoxypropylene diamine with an aromatic diamine liquid;
  mechanically purging the mixture under pressure with an isocyanate;
  applying the purged mixture to a desired irregular structure.

According to an aspect of the present invention there is a method for stabilizing irregular rock and concrete structures, the method comprising:
  concurrently heating and mixing in about a 2:1 to 1:1 ratio, a mixture of polyoxypropylene diamine with an aromatic diamine liquid;

mechanically purging the mixture under pressure with an isocyanate to create a fibrous mesh, the mesh being applied to a desired irregular rock and concrete structure.

Preferably, the mixture is heated from about 90° F. to about 115° F. and purged under pressure from about 1000 psi to about 3500 psi In this manner, optimal fiber sizes and lengths are accomplished to enmesh fill in gaps between and stabilize irregular rock and concrete structures.

According to another aspect of the present invention is a method for stabilizing irregular rock, concrete and molding tool structures, the method comprising:

concurrently heating and mixing in about a 2:1 to 1:1 ratio, a mixture of polyoxypropylene diamine with an aromatic diamine liquid;

mechanically purging the mixture at over about 1000 to 3500 psi with an isocyanate to create a plastic film, the plastic film being applied to a desired irregular structure.

Preferably in this aspect, the mixture is heated from about 140° F. to 170° F. In this manner, under the appropriate high pressure the irregular rock, concrete or molding tool surfaces are stabilized within a plastic film type of coating which is impermeable to air and water. In accordance with this aspect, other materials can be added to the purged mixture to alter the final plastic polyurea film material. Such materials include but are not limited to fire-retardants, ceramic microspheres, rubber crumbs and the like.

According to another aspect of the present invention is a cohesive polyurea mesh for use in consolidating and stabilizing irregular rock concrete and molding tool structures.

According to a further aspect of the present invention is a fibrous polyurea mesh for stabilizing and supporting irregular rock and concrete structures, the mesh comprising:

elongate fibers comprising a mixture of polyoxypropylene diamine and aromatic liquid diamine;

said fibers having a high tensile strength; and said fibers being weather resistant and anticorrosive.

According to still a further embodiment of the invention is a cohesive fibrous mesh comprising strands of inorganic polymers for stabilizing irregular surfaces.

According to yet a further embodiment of the invention is a cohesive fibrous mesh comprising flame retardant strands of inorganic polymers and additionally comprising a flame retardant.

Preferably, the mesh is made of a polyurea material vehicle when dry provides a durable, damage resistant, hard protective surface which is moisture resistant, has a high tensile strength and is non-flammable.

According to another aspect of the present invention is a polyurea geotextile mat for use in consolidating and stabilizing irregular rock, concrete, and dirt surfaces.

According to another aspect of the present invention is a polyurea plastic film for use in stabilizing molds and molding tool structures.

According to another aspect of the present invention is a polyurea foam for use in consolidating and stabilizing irregular rock, concrete, molding tool and dirt surfaces and other composite structures and manufactured parts.

BRIEF DESCRIPTION OF THE DRAWINGS

A detailed description of the preferred embodiments are provided herein below with reference to the following drawings in which:

FIG. 2 is a photograph showing the fibrous nature of the stabilizing coating as formed by the method of the present invention;

FIGS. 3A through 3E are photographs showing how the method of the present invention is applied to stabilize adjacent, but separate rock structures.

Figure 1A:
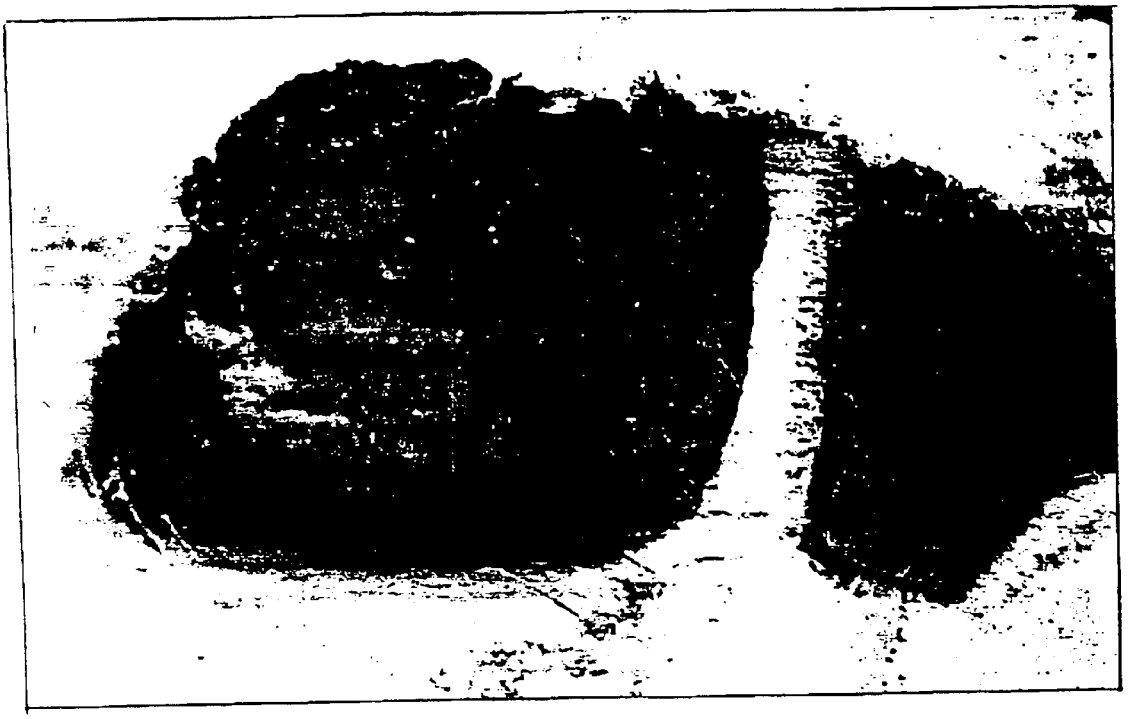
FIG. 1A is a photograph of rocks stabilized in accordance with the method of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS

The invention is a fast reacting method of making a polyurea material and the polyurea materials so prepared. The method and the polyurea materials have widespread use in the stabilization of irregular surfaces and structures such as irregular rock, concrete and molding tool structures.

The method of the present invention provides in a first preferred embodiment a cohesive unwoven weather resistant mesh that is applied to irregular and uneven surfaces and acts to stabilize such surfaces and as such has use in the mining industry.

In accordance with the method of the present invention, a polyoxypropylenediamine and an aromatic diamine liquid is sprayed in a ratio of about 2:1 to 1:1 (v/v) with a prepolymer MDI isocyanante through a heated urethane proportioner. A ratio of about 1:1 is most preferred. The aromatic diamine liquid is susceptible to temperature fluctuations. Thus at higher temperatures the resultant polyurea material is less structured and more "plastic" liquid for wetting out. This mixture is then processed with an impingement mixing spray gun at a suitable pressure of about 1000 psi to about 3500 psi using mechanical purge and without a spray tip design. A pressure of about 2000–2500 psi is preferred. Suitable spray guns for use in the method are the Gusmer D™ gun or the Intergun GG™ gun. The resultant product is a fibrous sticky mesh when dispensed at a suitable temperature of about 90° F. to about 115° F., most preferably about 110° F.

The MDI (methylene diparaphenylene isocyanate) isocyanate acts as a catalyst and can be for example but not limited to diphenyl methane 4,4'-diisocyanate. The functionality of the isocyanate may vary as is understood by one of skill in the art. The aromatic diamine for use in the method of the invention may be a variety of such compounds which provide the necessary fluidity properties to the resultant a purged material as is well understood by one skilled in the art. Representative examples of suitable aromatic diamines for use in the invention include but are not limited to di(methylthio)toluene amine and diethyl toluene diamine.

The fibrous spray projects from the spray gun approximately 8 to 10 feet when dispensed at approximately 2000 psi. The fibrous mesh takes approximately one minute to dry from a sticky mesh to a hard finish depending on the external environmental conditions. The fibrous spray is advantageous in that it does not essentially drip from ceilings as it is being applied but instead "sticks" or "adheres" to the surface to which it is being applied.

Figure 1B:
FIG. 1B is a closer view of the photograph of FIG. 1A.
Figure 3B:
Figure 3C:
Figure 3D:
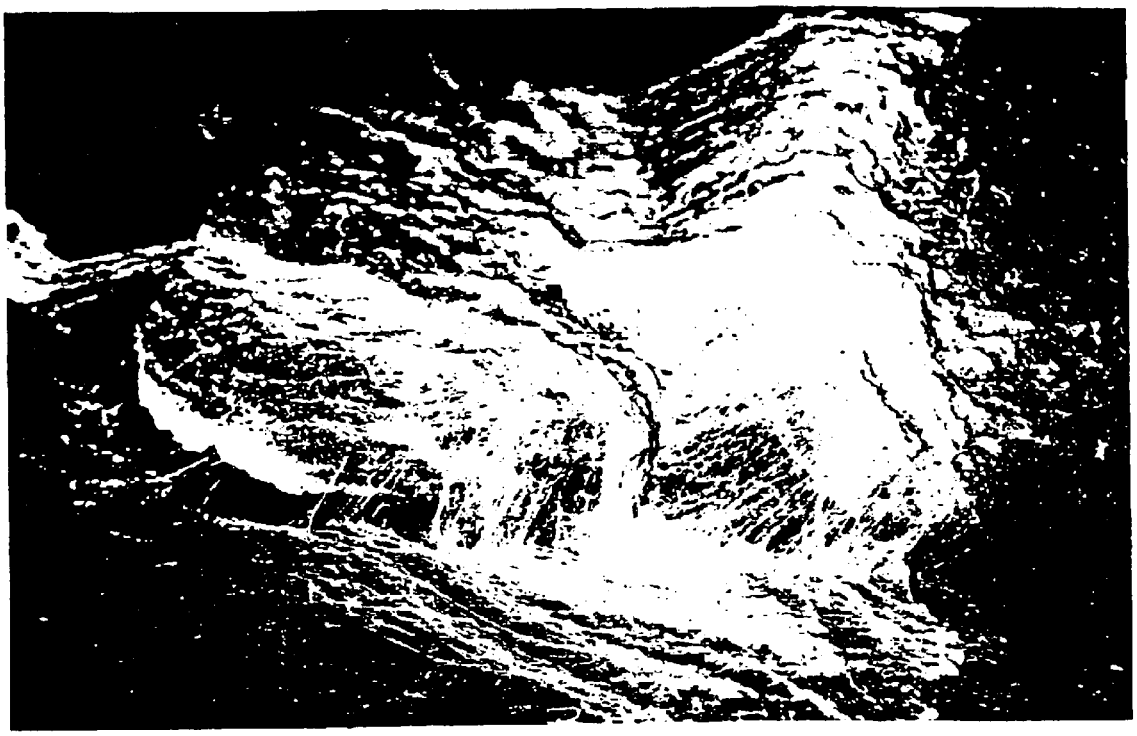
Figure 3E:
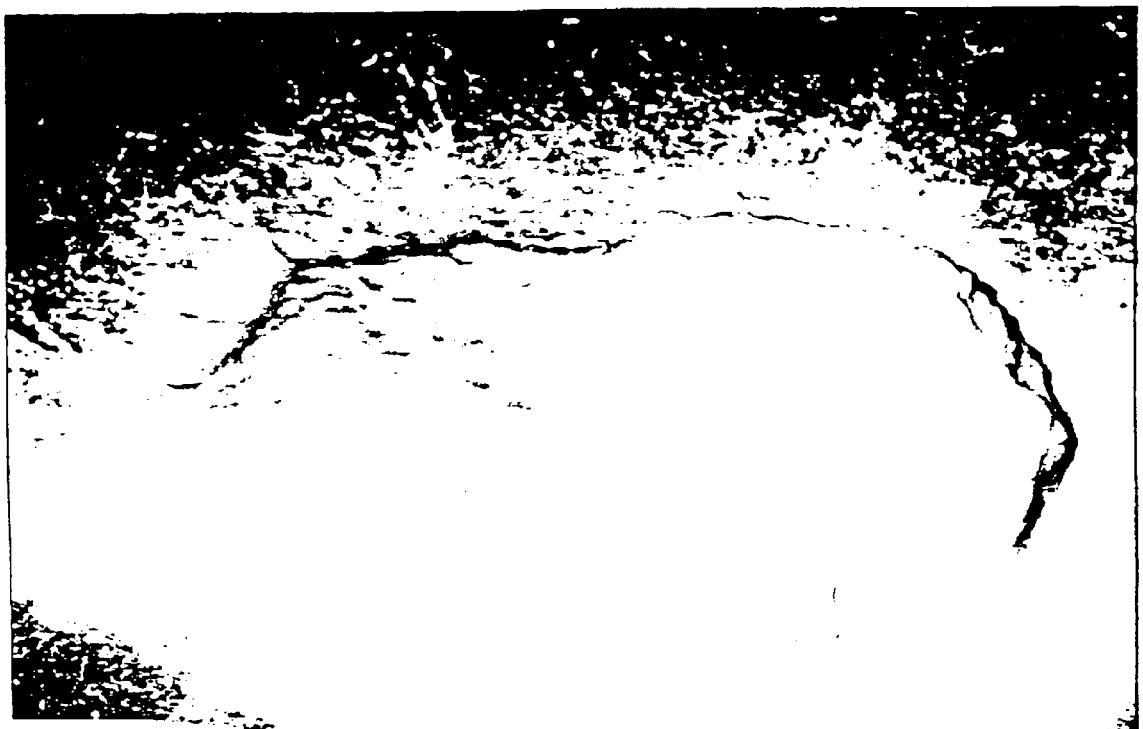

Such a fibrous mesh can be sprayed onto irregular rock structures in order to stabilize them. This is shown in FIGS. 1A and 1B. In these Figures, rocks are shown embedded within the mesh. FIG. 2 illustrates the fibrous mesh like characteristics of the resultant product. FIGS. 3A through 3E shows how the method of the present invention is used to stabilize two rocks which are spaced about 2 inches apart. FIG. 3E in particular, shows that the rocks can be completely enmeshed with the coating material. All of these Figures demonstrate that the fibrous mesh effectively fills the voids and gaps between separate rock structures holding such structures in place. This effectively stabilizes such structures so that they do not fall apart or cave in. As such, the method has particular use in the mining industry to stabilize tunnels and create a safer working environment.

The fibrous mesh can also be sprayed onto a selected surface to create a mat-like appearance resembling a geotextile used in the landscaping and road building trades. The fibers can be sprayed to accumulate and be built up to any desired thickness on any surface. The fibers can even be sprayed on to dirt surfaces or to fill cracks up to about 6 inches wide.

In another aspect of the present method, the mixture of polyoxypropylenediamine and aromatic diamine liquid is sprayed in about from 2:1 to 1:1 ratio with a prepolymer MDI isocyanante at a temperature of about 140° F. to 170° F. and then purged at pressures of about 1000 to 3500 psi, with 2500 psi being most preferred, in order to have the fibers become liquid and wet out to form a plastic film. In this aspect, a ratio of polymers of 1:1 is most preferred along with a temperature of about 145° F. to 150° F.

In this embodiment of the invention, several different types of materials can be added to the purging mixture such as for example fire retardants, ceramic microspheres, rubber tire crumbs, fibrous and/or particulate-type material. Materials, which can be employed, include a wide variety of fibers, and more particularly glass fibers, such as chopped or woven glass fibers. The glass fibers may be chopped into short fibers by a chopper above or adjacent the exit nozzle of the spray equipment, so that the chopped glass falls onto the reaction mixture exiting from the nozzle tip of the spraying equipment. In addition, particulate materials may be employed, as well as other additive materials, such as pigment dyes, carbon particles, carbon fibers, synthetic fibers, natural fibers and various other additives as well as combinations thereof.

For example, a machine can be used to fog particles of a fire retardant material into the path of the liquid spray. Suitable fire retardant materials include for example, particles of chemically altered grafite (GrafGuard™ manufactured by UCAR Carbon Company Inc.). One skilled in the art would readily comprehend the type of fire retardant materials that can be used in the method of the present invention. This composite when exposed to about 160–170° F. explodes to form a carbon strand about 100 times its original volume creating an intumescent fire proof shell to protect. The liquid spray may be loaded with about 0.25 kg Grafguard™ per square meter at 1 mm thickness. As modified to provide a fluid plastic film, the resultant plastic film is air and liquid impermeable and has been demonstrated to have a class A frame spread of 20 with a smoke generation of 40 (E84 Steiner Tunnel Flame Spread Test).

It is preferred that the method of the present invention be used to stabilize rock structures in mining and in particular, underground mining. The method can be used as a substitute for the conventional liquid thin sprayed membranes or order to effectively adjoin and secure adjacent rocks to create a self supporting arch even in the presence of gaps and holes. This helps to prevent cave-ins. However, it is understood by those skilled in the art that method of the present invention can be used to stabilize any type of irregular rock or concrete type structure whether it be indoors or outdoors. The method also has use to stabilize and enforce secondary containment dikes around storage tanks and spill areas. As such, the method has value for hazardous containment work. The method of the present invention also has use in the general construction industry as well as potentially in sewer manhole rehabilitation as well as in landscaping, ornamental pond construction and road building.

As a plastic film coating, the coating can be applied in mold making as it cures very quickly and the resultant hardened product is very durable compound to other molded coatings and fiberglass. In this aspect, the liquid coating is sprayed as a skin onto a waxed model to facilitate its release therefrom. Supports or "strong-backs" may be used and placed for stiffening along the encased mold. The fiber mesh type material is then sprayed to lock on the supports creating a tough and durable mold tool. As a film coating it may be used in conjunction with other open mold surfaces or even a gel coat molds, such as a polyester gel coat or acrylic molds.

In yet a further embodiment of the invention, the method can be practiced by spraying the mixture of polyoxypropylenediamine and aromatic diamine liquid in about from 2:1 to 1:1 ratio with a prepolymer MDI isocyanante at a temperature of about 110° F. to 130° F., most preferably 130° F., and then purged at pressures of about 1000 to 3500 psi in order to create a "jelly-like" material that is useful in the construction industry. Such a "jelly-like" material can be used as an adhesive in the construction industry as it has been found to cure and harden in seconds thus setting any type of brace or similar material embedded therein.

As a plastic film coating, a water stream may be introduced as a fine mist, atomized, to mix thoroughly with the chemicals as they are purged and create a foam of fine bubbles. Such foam may be used as an open mold or as a medium for fillers, fibers and other structural enhancements. A combination of the plastic film and foam forms a tough composite having widespread use in the molding industry.

One skilled in the art will recognize that the method of the invention may be practiced to provide for a multilayered type of coating or reinforcement material that may comprise various layers of a plastic film, fibrous mesh, matted mesh and foam.

In summary, the present invention provides a rapid and easy method for providing a durable and weather resistant mesh or plastic film coating that provides good strength and support of irregular structures such as rock, concrete and molding tool structures. The resultant product, whether provided as a fibrous mesh, a matted mesh, plastic film or foam has anti-corrosion and chemical resistance. Furthermore, flame-retardant materials as known to those skilled in the art can be introduced into the liquid type polyurea material or as a layer on top of the finished product in order to provide for the non-flammable properties.

Although preferred embodiments have been described herein in detail, it is understood by those skilled in the art that variations may be made thereto without departing from the scope of the invention.

What is claimed is:

1. A method for stabilizing irregular rock, concrete and molding tool structures, the method comprising:
    concurrently heating and mixing a mixture of polyoxypropylene diamine with an aromatic diamine liquid in about a 2:1 to 1:1 ratio;
    mechanically purging the mixture under pressure with an isocyanate;

applying the purged mixture to a desired irregular structure.

2. The method of claim 1, wherein said mixture is heated at a temperature of about 90° F. to 115° F. and mechanically purging said mixture at a pressure at about 1000–2500 psi to create a fibrous mesh.

3. The method of claim 2, wherein said mixture is heated at a temperature of about 100° C. and mechanically purged at a pressure of about 2000 to 2500 psi to create a fibrous mesh.

4. The method of claim 1, wherein said mixture is heated at a temperature of about 140° F. to 170° F. and mechanically purged at a pressure of about 1000 to 3500 psi to create a plastic film.

5. The method of claim 1, wherein said mixture is heated at a temperature of about 110° F. to 130° F. and mechanically purged at a pressure of about 1000 to 3500 psi to create an adhesive jelly.

6. The method of claim 4 additionally comprising the step of adding a fine mist of water to the mechanically purged mixture to create a foam.

7. The method of claim 1, wherein said isocyanate is a methylene diparaphenylene isocyanate.

8. The method of claim 7, wherein said methylene diparaphenylene isocyanate is diphenyl methane 4,4' diisocyanate.

9. The method of claim 4, additionally comprising the step of adding a material to the purged mixture, said material being selected from the group consisting of fire retardants ceramic microspheres, rubber tire crumbs, glass fibers, pigment dyes, carbon particles, carbon fibers, synthetic fibers and natural fibers.

10. The method of claim 9, wherein said fire retardant is chemically altered graphite.

* * * * *